Feb. 17, 1959  K. CONRAD  2,873,555
CHUTE FOR CONVEYING MOLTEN GLASS
Filed Jan. 27, 1954
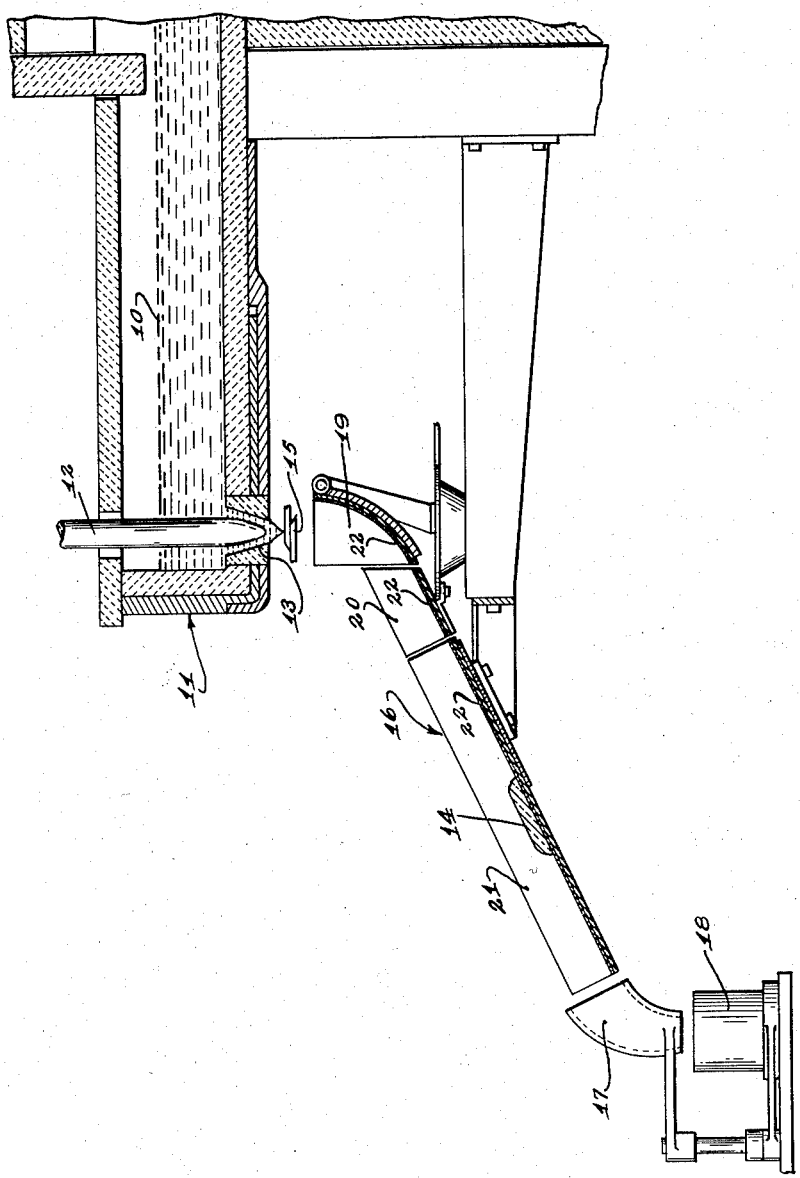
Inventor
KEITH CONRAD
By Rule & Hoge
Attorneys

2,873,555

CHUTE FOR CONVEYING MOLTEN GLASS

Keith Conrad, Toledo, Ohio, assignor to Owens-Illinois Glass Company, a corporation of Ohio Application January 27, 1954, Serial No. 406,398

4 Claims. (Cl. 49—14)

This invention relates to the manufacture of glass articles from charges of molten glass and more particularly to apparatus for conveying molten glass.

In one method of glass manufacture, gobs or charges of molten glass are severed from a supply body of molten glass and are conveyed by free fall over chutes to molds or other apparatus for forming the glass articles.

Important considerations are involved in conveying the gob or charge from the body of glass to the mold or other forming mechanism. First, the time interval of travel must be constant in order to insure efficient and uniform operation. Second, the shape of the gob must not be altered during the travel since such alteration may cause distortion in the finished article. Third, the surface of the article must not be chilled or contaminated.

If the chutes for conveying the glass are plain metal or other untreated material, the hot gob of glass has a tendency to become adhered thereto resulting in either a failure to travel to the mold or a distortion in the shape of the gob. As a result it has been common practice to lubricate the chute by either intermittent or continuous application of oil or an oil-base dope. Such a treatment of the chute facilitates the passage of the glass but it is only temporary and necessitates frequent or continuous application of the oil or oil dope. In spite of such continued application, the time of travel of the gob of glass is extremely erratic and not constant. In addition, the oil has a tendency to form a carbonaceous deposit on the gob which remains in the finished article. Also the great variation in lubrication causes the gob to become scratched or marred producing scars or imperfections in the finished article. Finally, the oil and water which are always present in the vicinity of glass forming apparatus tend to further complicate the problem of lubrication by forming on the surface of the chute and adversely affecting the lubricating action.

I have determined that a satisfactory coating for chutes should have the following requirements. First, the frictional drag must be reduced to a minimum so that the travel of the gob is fast and constant, and the shape of the gob is not altered. Second, the coating must be hard and abrasion resistant in order not to contaminate the surface of the gob and in order not to be worn off the chute rapidly. Third, the coating must be resistant to heat. Fourth, the coating must be resistant to oil and water which are inherently present in the vicinity of the apparatus.

It is therefore an object of this invention to provide a coating for the chutes which obviates the difficulties inherent in an oil dope and in addition fulfills these requirements.

The accompanying drawing is a part sectional elevational view of an apparatus in which the invention may be embodied and employed.

Referring to the drawing, molten glass 10 is shown in a feeder 11. The feeder 11 is of conventional construction and is provided with a plunger 12 reciprocable in opening 13 to form gobs or charges 14 of molten glass. These gobs are severed from the body of glass by shears 15. The severed gobs fall freely and are guided by a chute 16 to funnel 17 which in turn directs the gobs to molds 18. The chute 16 may consist of several sections 19, 20 and 21.

Each of the sections 19, 20 and 21 of the chute 16 is provided with a heat-resistant coating 22 having the composition and made in accordance with my invention.

It has heretofore been suggested that a coating having the desired properties comprises a phenolic resin and a filler such as graphite. Such a coating and method of conveying molten glass is disclosed in Smith U. S. Patent 2,758,421, over which the present invention is an improvement.

My invention relates to a further improvement in coatings for conveying chutes. I have determined that a coating having improved properties comprises sulfur, phenolic resin, and a filler such as graphite. The combination of the ingredients may be varied within wide limits to provide the exact results desired, but I have determined that the coating should preferably contain not more than approximately 50% sulfur and at least 10% graphite.

In applying the heat-resistant coating 22 to the chute, the chute is first thoroughly cleaned by solvents, grit blasting or in any other suitable manner. Sulfur, thermosetting resin and graphite are intimately mixed with a thinner and the mixture is then applied to the chute by painting, spraying or dipping. The coated chute is then baked to volatilize the thinner, cure the resin and bond it to the chute. A heavy coating or successive coatings may be applied; the thicker the coating, the longer the life of the coating.

The following examples are representative of coating compositions which have given satisfactory results:

COMPOSITION BY WEIGHT

| Percent sulfur | Percent resin | Percent graphite |
|---|---|---|
| 50 | 40 | 10 |
| 40 | 40 | 20 |
| 40 | 50 | 10 |
| 30 | 40 | 30 |
| 30 | 50 | 20 |
| 20 | 40 | 40 |
| 10 | 40 | 50 |

Example

The following is a specific example of the application of the coating:

(1) Crush 26 oz. sulfur to a fine powder.
(2) Add 13 oz. graphite.
(3) Add 1 qt. (2½ lbs.) phenolic resin having 69% solids and a curing temperature of about 250° F.
(4) Add approximately 1 qt. thinner.
(5) Paint on cleaned metal chutes.
(6) Bake at 250° F. for one hour.
(7) Repeat steps 5 and 6 to build up desired thickness of coating.
(8) Bake last coat 8 hours at 250° F.

In applying the coating care should be exercised in order that the sulfur will not be heated to excessively high temperatures.

Among the coatings which I have tested, the coats having a composition of 40% sulfur, 50% phenolic resin and 10% graphite, and 40% sulfur, 40% phenolic resin and 20% graphite, have given the best results from the standpoint of uniform and constant travel of the charge of glass combined with long life of the coating; for example, a coating of the latter formulation endured continuous operating conditions for a period of six days, in contrast to other coatings which last only about one day.

Results of extensive tests on coatings of my composition show that the chutes coated as described offer distinct advantages not heretofore obtained. For example, the time of travel is uniform and constant as contrasted to bare chutes or chutes swabbed with oil or oil dope. The frictional drag is decreased to a minimum so that the shape or surface of the gob is not altered. The coating does not contaminate the surface of the gob, and is resistant to heat. Oil and water do not affect the coating. The coating made in accordance with this invention thus possesses all the desired properties of such a coating.

Results of experimentation with chutes having coatings of my preferred compositions also show that the charge of glass moves down the chute at greater speed of travel than on chutes having coatings of resin and graphite, and at much greater speeds of travel than on chutes swabbed with oil or oil dope. This is especially of value in present day development of high speed glassmaking machines where one limitation has been the speed of travel of the gob to the machine.

Modifications may be resorted to within the spirit and scope of the appended claims.

I claim:

1. Apparatus for receiving and delivering a gob of molten glass which comprises a chute structure having an inclined glass guiding surface, and heat-bonded to said surface a coating consisting essentially of an intimate mixture of a thermo-setting resin, graphite, and not less than 10% by weight nor more than 50% by weight of sulphur.

2. Apparatus for receiving and delivering a gob of molten glass which comprises a chute structure having an inclined glass guiding surface, and heat-bonded to said surface a coating consisting essentially of an intimate mixture containing from 40% to 50% by weight phenolic resin, the remainder of said mixture consisting of complementary proportions of graphite and sulphur, but in no case less than 10% by weight of either.

3. Apparatus for receiving and delivering a gob of molten glass which comprises a chute structure having an inclined glass guiding surface, and heat-bonded to said surface a coating consisting essentially of an intimate mixture containing 40% by weight sulphur, 10% to 20% by weight graphite, and the remainder consisting of phenolic resin.

4. For use with a glass feeder delivering gobs of molten glass, a gob chute mounted beneath the feeder in position for receiving gobs of molten glass as they are delivered from the feeder, said chute having a downwardly inclined guiding surface along which the molten gobs are guided, the chute comprising a coating bonded thereto and forming the guiding surface, said coating consisting essentially of an intimate mixture of a phenolic resin, graphite, and not less than 10% by weight nor more than 50% by weight of sulphur.

References Cited in the file of this patent

UNITED STATES PATENTS

| | | |
|---|---|---|
| 1,199,108 | Peiler | Sept. 26, 1916 |
| 2,106,545 | Bates | Jan. 25, 1938 |
| 2,703,768 | Hall | Mar. 8, 1955 |
| 2,758,421 | Smith | Aug. 14, 1956 |

FOREIGN PATENTS

| | | |
|---|---|---|
| 270,271 | Great Britain | 1928 |